(12) United States Patent
Ko et al.

(10) Patent No.: US 8,836,870 B2
(45) Date of Patent: Sep. 16, 2014

(54) VIEWING GLASSES, 3D DISPLAY SYSTEM AND IMAGE BEAM ADJUSTMENT METHOD THEREOF

(75) Inventors: Chueh-Pin Ko, Taipei Hsien (TW); Dong-Hsing Su, Taipei Hsien (TW)

(73) Assignee: Acer Incorporated, New Taipei (TW)

( * ) Notice: Subject to any disclaimer, the term of this patent is extended or adjusted under 35 U.S.C. 154(b) by 826 days.

(21) Appl. No.: 12/982,879

(22) Filed: Dec. 31, 2010

(65) Prior Publication Data

US 2012/0033145 A1 Feb. 9, 2012

(30) Foreign Application Priority Data

Aug. 6, 2010 (TW) ................................ 99126262 A

(51) Int. Cl.
| G02F 1/1335 | (2006.01) |
| G02B 27/26 | (2006.01) |
| H04N 13/04 | (2006.01) |
| G02B 27/00 | (2006.01) |

(52) U.S. Cl.
CPC ........ *H04N 13/0434* (2013.01); *H04N 13/0479* (2013.01); *G02B 27/0093* (2013.01); G02B 27/26 (2013.01)
USPC .......................................................... 349/13

(58) Field of Classification Search
USPC .......................................................... 349/13
See application file for complete search history.

(56) References Cited

U.S. PATENT DOCUMENTS

| 5,699,133 | A | | 12/1997 | Furuta | |
| 6,115,177 | A | * | 9/2000 | Vossler | ........................ 359/465 |
| 8,269,822 | B2 | * | 9/2012 | Zalewski | ........................ 348/56 |
| 2002/0044350 | A1 | | 4/2002 | Sato et al. | |
| 2002/0122145 | A1 | | 9/2002 | Tung | |
| 2004/0027510 | A1 | | 2/2004 | Iijima et al. | |
| 2008/0062259 | A1 | * | 3/2008 | Lipton et al. | .................... 348/58 |
| 2008/0204874 | A1 | | 8/2008 | Kim et al. | |
| 2011/0149028 | A1 | * | 6/2011 | Klebanov et al. | ............... 348/43 |
| 2012/0023540 | A1 | * | 1/2012 | Meuninck et al. | ............ 725/118 |
| 2013/0027526 | A1 | * | 1/2013 | Mao | ................ 348/56 |

FOREIGN PATENT DOCUMENTS

| CN | 2514364 | 10/2002 |
| CN | 101377573 | 3/2009 |
| CN | 101738760 | 6/2010 |
| KR | 20020050042 | 6/2002 |
| WO | 2008002433 | 1/2008 |
| WO | 2010084849 | 7/2010 |

OTHER PUBLICATIONS

"Search Report of European Counterpart Application", issued on Aug. 16, 2013, p. 1-p. 7, in which the listed references were cited.

* cited by examiner

*Primary Examiner* — Michelle R Connelly
(74) *Attorney, Agent, or Firm* — Jianq Chyun IP Office

(57) ABSTRACT

A pair of viewing glasses, a three-dimensional (3D) display system and an image beam adjustment method are provided. The adjustment method includes determining an adjustment angle according to an image beam emitted by a display screen; detecting a relative spatial orientation of the viewing glasses and the display screen; determining a compensation angle according to the relative spatial orientation; and adjusting the polarization direction of the image beam according to at least one of the adjustment angle and the compensation angle, so as to change the polarization direction of the image beam to a target polarization direction parallel or perpendicular to the polarization axis direction of a polarizer of the viewing glasses.

25 Claims, 9 Drawing Sheets

VIEWING GLASSES, 3D DISPLAY SYSTEM AND IMAGE BEAM ADJUSTMENT METHOD THEREOF

CROSS-REFERENCE TO RELATED APPLICATION

This application claims the priority benefits of Taiwan application serial no. 99126262, filed on Aug. 6, 2010. The entirety of the above-mentioned patent applications is hereby incorporated by reference herein and made a part of this specification.

BACKGROUND

1. Field of the Invention

The invention relates to a display system and an image beam adjustment method thereof. Particularly, the invention relates to a three-dimensional (3D) display system using a pair of viewing glasses, and an image beam adjustment method thereof.

2. Description of Related Art

Ongoing development of display technology has led not only to displays that are light, thin and small, but also to displays that can generate three-dimensional (3D) images. 3D image display devices send different images to the left and right eyes of a user, which the user's brain interprets as a 3D image.

At present, there are two main types of 3D display device, i.e. a display that requires glasses and a display that does not require glasses. 3D glasses in turn include several types, the earliest being red and blue glasses, and more recent types including shutter glasses, and polarization glasses. Each of these types of glasses causes different images to be transmitted to the left eye and the right eye of the user, which are interpreted by the user as a 3D image. 3D shutter glasses are generally used in combination with various display devices such as a 3D liquid crystal television and a 3D projector, etc. to create a 3D effect.

Conventional shutter glasses include a front polarizer, a liquid crystal layer and a back polarizer. The polarization axis of the front polarizer is parallel to a polarization direction of an image beam emitted by the 3D display device, and the polarization axes of the front polarizer and the back polarizer are orthogonal to one another. The liquid crystal layer is disposed between the front polarizer and the back polarizer, and changes the polarization direction of the image beam in response to an applied operating voltage. Therefore, after the image beam passes through the liquid crystal layer, the polarization direction of the image beam can be parallel or perpendicular to the back polarizer, so that the image beam can pass through the back polarizer or can be blocked by the back polarizer. By cyclically applying the operating voltage to a left lens and a right lens of the shutter glasses, the shutter glasses can block the left eye and the right eye images sent by the 3D display device in different times, so that the left eye of the viewer can view a left eye image, and the right eye of the viewer can view a right eye image, which the user interprets as a 3D image.

However, the polarization directions of image beams of different 3D display devices on the market do not have a uniform specification, and thus different display devices may send image beams of different polarization directions, so that shutter glasses having a given polarization axis direction can be used in only in conjunction with display devices having the corresponding image beam polarization direction, which may increase production cost and the price of the glasses. Meanwhile, users have to buy different glasses to match different 3D display devices, which drives up the cost to use the technology and may discourage its widespread adoption.

SUMMARY OF THE INVENTION

The invention is directed to a pair of viewing glasses, which can adjust a polarization direction of an image beam, so that the viewing glasses can be applied to three-dimensional (3D) display devices of different polarization directions.

The invention is also directed to a 3D display and a 3D display system using a pair of viewing glasses and an image beam adjustment method thereof, by which an adjustment angle of a polarization direction of an image beam can be compensated according to a viewing position and a viewing pose of a user, so as to avoid a problem of dark 3D images.

The invention provides a pair of viewing glasses for a 3D display device, wherein the 3D display device is used for displaying images on a display screen. The pair of viewing glasses includes a glasses frame, a first control unit and two lenses. The control unit outputs a control signal according to a polarization direction of an image beam emitted by the display screen and a polarization axis direction of a polarizer. The two lenses are disposed on the glasses frame, wherein each of the two lenses includes a polarizer and a polarization conversion unit. The polarization conversion unit is coupled to the first control unit, and is disposed between the display screen and the polarizer, and is controlled by the control signal to adjust the polarization direction of the image beam, so as to convert the polarization direction of the image beam to a first polarization direction or a second polarization direction, wherein the first polarization direction is perpendicular to the polarization axis direction of the polarizer, and the second polarization direction is parallel to the polarization axis direction of the polarizer.

In an embodiment of the invention, the polarization conversion unit is a single liquid crystal layer, wherein the control signal includes an operating voltage of the liquid crystal layer.

In another embodiment of the invention, the polarization conversion unit includes a first liquid crystal layer and a second liquid crystal layer. The first liquid crystal layer is disposed between the display screen and the polarizer, and is connected to a first control unit, and is controlled by a control signal to adjust the polarization direction of the image beam according to the polarization direction of the image beam and the first polarization direction, so as to convert the polarization direction of the image beam to the first polarization direction. Moreover, the second liquid crystal layer is disposed between the first liquid crystal layer and the polarizer, and is connected to the first control unit, and is controlled by the control signal to maintain the polarization direction of the image beam to the first polarization direction or convert the polarization direction of the image beam to the second polarization direction, wherein the control signal includes operating voltages of the first liquid crystal layer and the second liquid crystal layer.

The invention may also be embodied as a three-dimensional (3D) display system including a 3D display device and a pair of viewing glasses. The 3D display device is used for displaying images on a display screen. The pair of viewing glasses includes a glasses frame, a first control unit and two lenses. The first control unit outputs a control signal according to at least one of an adjustment angle and a compensation angle, wherein the adjustment angle is determined according to a polarization direction of an image beam emitted by the display screen, and the compensation angle is determined according to the relative spatial orientation of the viewing glasses and the display screen. The relative spatial orientation is the spatial relationship between the viewing glasses and the display screen when the pair of viewing glasses moves and/or rotates relative to the display screen along at least one of three coordinate axes of an orthogonal coordinate system. The two lenses are disposed on the glasses frame, wherein each of the two lenses includes a polarizer and a polarization conversion unit. The polarization conversion unit is coupled to a first control unit, and is controlled by the control signal to adjust the polarization direction of the image beam, so as to convert the polarization direction of the image beam to a first polarization direction or a second polarization direction, wherein the first polarization direction is perpendicular to a polarization axis direction of the polarizer, and the second polarization direction is parallel to the polarization axis direction of the polarizer.

In another embodiment of the invention, the pair of viewing glasses further includes a balance sensor and a first control unit. The balance sensor is coupled to the first control unit, and senses the relative spatial orientation. The first control unit determines the adjustment angle according to the polarization direction of the image beam, and determines the compensation angle according to the relative spatial orientation sensed by the balance sensor, and controls the polarization conversion unit to adjust the polarization direction of the image beam according to at least one of the adjustment angle and the compensation angle.

In another embodiment of the invention, a 3D display device further includes a sensor, a signal transmitter and a second control unit. The sensor is used for detecting the relative spatial orientation. The signal transmitter is used for transmitting a compensation signal corresponding to the compensation angle to the viewing glasses. Moreover, the second control unit is coupled to the sensor and the signal transmitter, and determines the compensation angle according to the relative spatial orientation detected by the sensor, and controls the signal transmitter to transmit the compensation signal according to the compensation angle.

In another embodiment of the invention, the pair of viewing glasses further includes a receiver and a first control unit. The receiver is coupled to the first control unit, and is used for receiving a compensation signal. The first control unit obtains the compensation angle according to the compensation signal, and controls the polarization conversion unit to adjust the polarization direction of the image beam according to at least one of the adjustment angle and the compensation angle.

In another embodiment of the invention, the pair of viewing glasses further includes a plurality of position signal transmitters, and each of the position signal transmitters sends a position signal. A sensor detects the position signals, and determines the relative spatial orientation according to information obtained when the position signals are detected.

In another embodiment of the invention, the sensor captures an image of the viewing glasses, and a second control unit analyzes the image for detecting the relative spatial orientation.

In another embodiment of the invention, the second control unit analyzes the image to detect a profile or a predetermined pattern of the viewing glasses, so as to obtain the relative spatial orientation.

In another embodiment of the invention, the second control unit analyzes the image to detect a relative spatial orientation of a face of a viewer using the viewing glasses relative to the display screen, so as to obtain the relative spatial orientation of the viewing glasses and the display screen.

In another embodiment of the invention, the viewing glasses further include a sensor used for capturing an image of the 3D display device, and the first control unit analyzes the image to detect the relative spatial orientation.

The invention also provides an image beam adjustment method of a 3D display system, wherein the 3D display system includes a 3D display device and a pair of viewing glasses. The 3D display device includes a display screen used for display images, and the pair of viewing glasses includes two lenses, and each of the two lenses includes a polarizer and a polarization conversion unit. The image beam adjustment method comprises determining an adjustment angle according to a polarization direction of an image beam emitted by the display screen. Then, a relative spatial orientation of the viewing glasses and the display screen is detected, wherein the relative spatial orientation is a spatial relationship between the viewing glasses and the display screen when the viewing glasses move and/or rotate relative to the display screen along at least one of three coordinate axes of an orthogonal coordinate system. Then, a compensation angle is determined according to the relative spatial orientation. Finally, the polarization direction of the image beam is adjusted according to at least one of the adjustment angle and the compensation angle, so as to convert the polarization direction of the image beam to a first polarization direction or a second polarization direction, wherein the first polarization direction is perpendicular to a polarization axis direction of the polarizer, and the second polarization direction is parallel to the polarization axis direction of the polarizer.

In another embodiment of the invention, the polarization direction of the image beam is different for different types of 3D display device.

In another embodiment of the invention, detecting the relative spatial orientation is effected by sending a plurality of position signals from the viewing glasses or the 3D display device. Then, the other of the viewing glasses and the 3D display device is used to detect the position signals, so as to obtain the relative spatial orientation according to time differences obtained when detecting the position signals.

In another embodiment of the invention, the step of detecting the relative spatial orientation includes using the 3D display device to capture an image of the viewing glasses, and analyzing the image to detect the relative spatial orientation.

In another embodiment of the invention, the step of detecting the relative spatial orientation includes using the 3D display device to analyze the image to detect a profile or a predetermined pattern of the viewing glasses, so as to obtain the relative spatial orientation.

In another embodiment of the invention, the step of detecting the relative spatial orientation includes using the 3D display device to analyze the image to detect a relative spatial orientation of a face of a viewer using the viewing glasses relative to the display screen, so as to obtain the relative spatial orientation of the viewing glasses and the display screen.

In another embodiment of the invention, the step of detecting the relative spatial orientation includes using the viewing glasses to capture an image of the 3D display device, and analyzing the image to detect the relative spatial orientation.

In another embodiment of the invention, the step of detecting the relative spatial orientation includes using the viewing glasses to analyze the image to detect a profile or a predetermined pattern of the 3D display device, so as to obtain the relative spatial orientation.

In the above-described aspects of the invention, the polarization conversion unit adjusts the polarization direction of the image beam according to the polarization direction of the image beam emitted by the display screen and the relative spatial orientation of the viewing glasses and the display screen, so that the viewing glasses can be applied to 3D display devices of different polarization directions, so as to save a production cost of a manufacturer, and meanwhile spare the user the expense of buying multiple pairs of glasses. Moreover, a problem of dark 3D images caused by different viewing positions and different viewing poses of the user can also be avoided.

In order to make the aforementioned and other features and advantages of the invention more fully comprehensible, several exemplary embodiments are described in detail below, with reference to the accompanying drawings.

DETAILED DESCRIPTION OF DISCLOSED EMBODIMENTS

Figure 1:
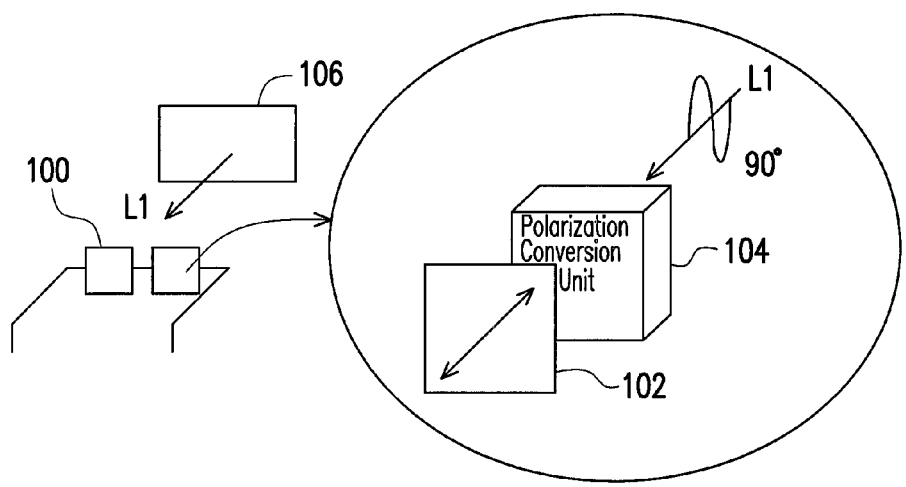
FIG. 1 is a schematic diagram illustrating a pair of viewing glasses of a three-dimensional (3D) display device according to an embodiment of the invention.

FIG. 1 is a schematic diagram illustrating a pair of viewing glasses of a three-dimensional (3D) display device according to an embodiment of the invention, wherein the pair of viewing glasses 100 is used for viewing images displayed on a display screen 106 of the 3D display device. The 3D display device can be a 3D liquid crystal display (LCD) of linearly polarized light, a 3D projector or other displays capable of sending polarized light, for example, an organic light emitting diode (OLED) projector or a digital light processing (DLP) projector having a polarizer. If the 3D display device is a 3D LCD, the display screen 106 refers to an image area of a LCD panel on the 3D LCD, and if the 3D display device is a 3D projector, the display screen 106 refers to an image display area of a planar image projected by the 3D projector.

The pair of viewing glasses 100 includes a glasses frame, and two lenses on the glasses frame that correspond to a left eye and a right eye. Each of the lenses includes a polarizer 102 and a polarization conversion unit 104 (though the invention is not limited thereto), wherein the polarization conversion unit 104 is disposed between the polarizer 102 and the display screen 106. The polarization conversion unit 104 receives an image beam L1 emitted by the display screen 106, and adjusts a polarization direction of the image beam L1 according to a control signal output by a control unit (not shown) of the viewing glasses 100, wherein the control signal is output by the control unit according to the polarization direction of the image beam L1 and a polarization axis direction of the polarizer 102. The polarization conversion unit 104 converts the polarization direction of the image beam L1 to be parallel or perpendicular to the polarization axis direction of the polarizer 102, so that the image beam L1 can be successfully transmitted to an eye of a viewer through the polarizer 102 to form an image, or the image beam L1 can be blocked so that the eye of the viewer cannot receive the image beam L1.

For example, assuming the polarization direction of the image beam L1 emitted by the display screen 106 is 90 degrees, and the polarization axis direction of the polarizer 102 is 135 degrees, the polarization conversion unit 104 can convert the polarization direction of the image beam L1 to 45 degrees or 135 degrees, so that the image beam L1 can pass through the polarizer 102 or can be blocked by the polarizer 102.

By respectively controlling the polarization conversion units 104 in the left and the right lenses, and determining a passing through state of the image beam L1 according to a sequence of a left eye and a right eye images, the left eye image or the right eye image of the viewer is sequentially shielded, so as to achieve a 3D image viewing effect. Since the polarization conversion unit 104 can adjust the polarization direction of the image beam L1 according to the polarization direction of the image beam L1 and the polarization axis direction of the polarizer 102, regardless of the polarization direction of the image beam L1 emitted by the display screen 106, the polarization conversion units 104 in the left and the right lenses can convert the polarization direction of the image beam L1 to be parallel or perpendicular to the polarization axis direction of the polarizer 102, so as to achieve the 3D image effect by sequentially shielding the left and the right eye images.

The viewing glasses 100 can obtain the polarization direction of the image beam L1 in a variety of ways: the 3D display device can send a signal to notify the polarization direction of the image beam L1 to the viewing glasses 100, or a switch or an input device such as a knob can be provided on the viewing glasses 100 to facilitate a manual operation by the viewer, or the viewing glasses 100 can automatically detect the polarization direction of the image beam L1.

Therefore, the viewing glasses 100 of the present embodiment can resolve the problem of the conventional art that only one specified 3D display device can be supported, so as to save a production cost of a manufacturer, and meanwhile spare the user from the need to buy multiple different glasses to view 3D display devices of different specifications.

Figure 2:
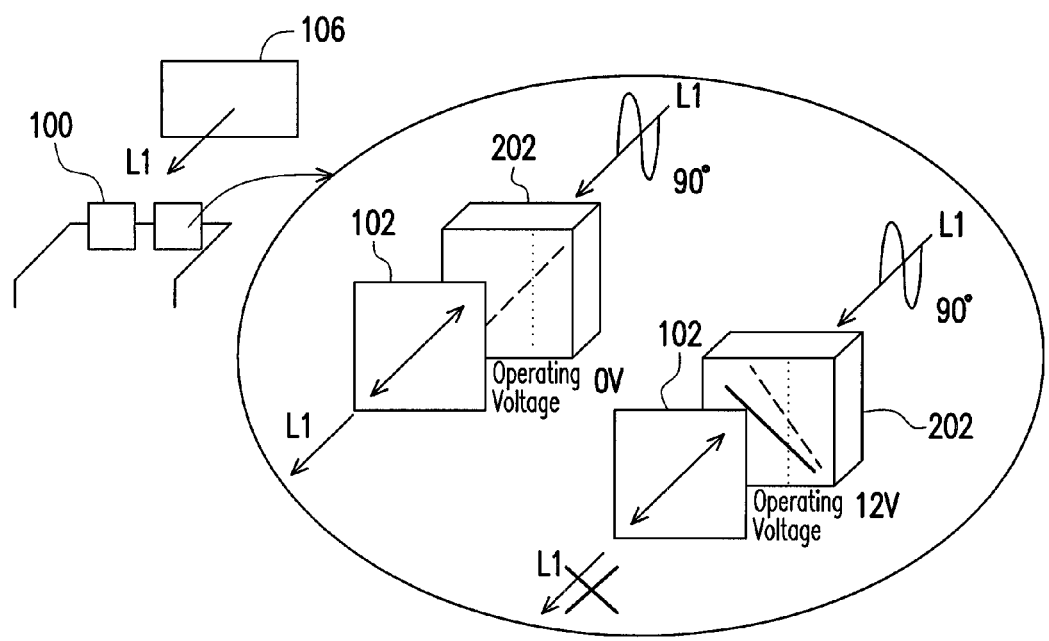
FIG. 2 is a schematic diagram illustrating a pair of viewing glasses of a 3D display device according to another embodiment of the invention.
Figure 3:
FIG. 3 is a diagram illustrating a relationship between polarization directions of an image beam and operating voltages.

The polarization conversion unit 104 can be a liquid crystal layer 202, such as that shown in FIG. 2. The liquid crystal layer 202 can change the rotation angle of the liquid crystals in the liquid crystal layer 202 according to a control signal (for example, an operating voltage) exerted thereon, so as to convert the polarization direction of the image beam L1 to be parallel or perpendicular to the polarization axis direction of the polarizer 102. FIG. 3 is a diagram illustrating a relationship between the polarization directions of the image beams L1 and the operating voltages of the liquid crystal layer. When the 3D display devices use different types of liquid crystal, for example, an in-plane switching (IPS) type, a twisted nematic (TN) type, an optically compensated bend (OCB) type, or a vertical alignment (VA) type, etc., the polarization direction of the image beam L1 emitted by the 3D display device is also different. For example, the first diagram at the left of FIG. 3 illustrates a liquid crystal polarization direction of an IPS LCD display device, and the second and third diagrams illustrate liquid crystal polarization directions of the TN type and VA type display devices, respectively. By applying voltages corresponding to different polarization directions to the liquid crystal layer 202, different polarization directions of the image beams L1 can be converted to be parallel or perpendicular to the polarization axis direction of the polarizer 102, so that the image beam L1 can pass through the polarizer 102, or can be blocked by the polarizer 102.

For example, according to the image beams L1 having different polarization directions (from the left to the right, angles of the polarization directions are 0 degree, 135 degrees, 90 degrees and 45 degrees) in FIG. 3, corresponding operating voltages (values thereof are sequentially 2V, 2.3V, 2.8V and 3.1V) are applied to the liquid crystal layer 202, so that the polarization directions of the image beams L1 of FIG. 3 are converted to be perpendicular to the polarization axis direction of the polarizer 102, and therefore the image beams L1 cannot pass through the polarizer 102. When the operating voltage applied to the liquid crystal layer 202 is 0V (i.e. no voltage is applied to the liquid crystal layer 202), the liquid crystal layer 202 automatically converts the polarization direction of the image beam L1 to be parallel to the polarization axis direction of the polarizer 102, so that the image beam L1 can pass through the polarizer 102. The voltage values 2V, 2.3V, 2.8V and 3.1V shown in FIG. 3 correspond to values of the voltages respectively applied to the liquid crystal layer 202 when the image beams L1 of different polarization directions are blocked by the polarizer 102.

The voltage values of FIG. 3 are only used as an example, during an actual application, since a design detail of the liquid crystal layer 202 is already known, as long as an adjustment angle of the polarization direction of the image beam L1 is known, the operating voltage required to be applied can be easily obtained.

Figure 4:
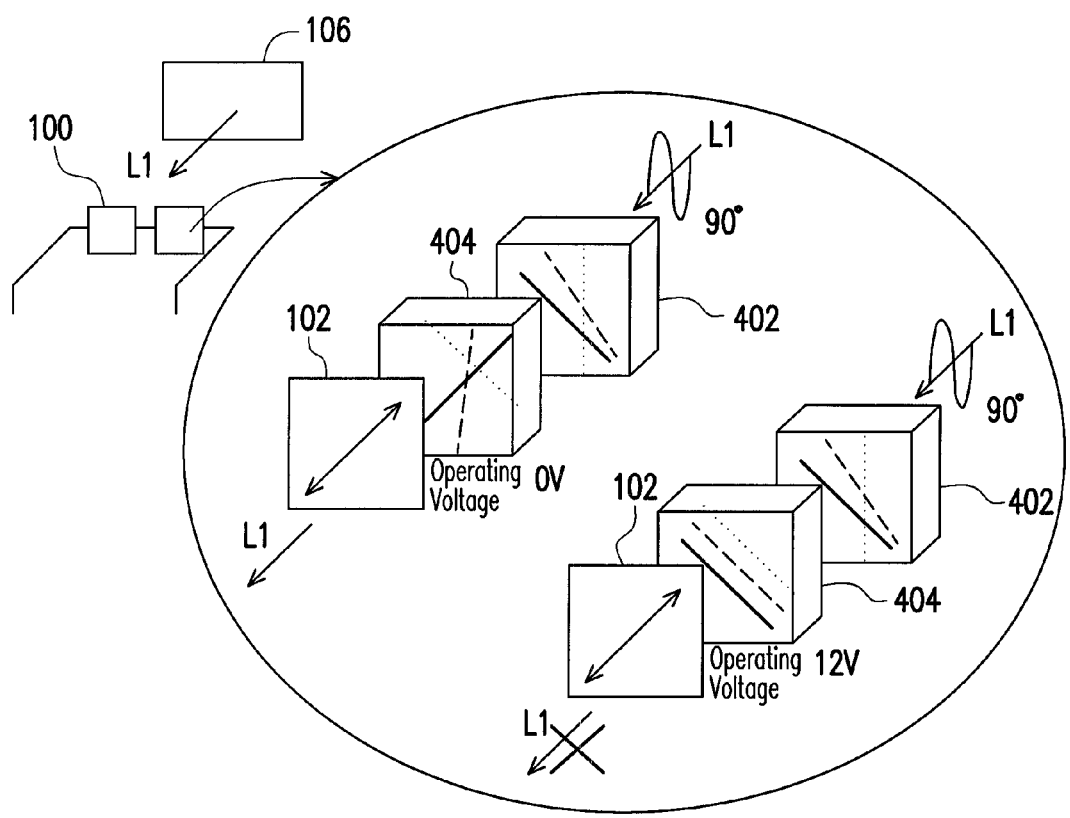
FIG. 4 is a schematic diagram illustrating a pair of viewing glasses of a 3D display device according to another embodiment of the invention.

FIG. 4 is a schematic diagram illustrating a pair of 3D viewing glasses according to another embodiment of the invention. Referring to FIG. 4, the polarization conversion unit 104 of FIG. 1 can be implemented by two liquid crystal layers 402 and 404, wherein the liquid crystal layer 402 is disposed between the display screen 106 and the polarizer 102, and the liquid crystal layer 404 is disposed between the liquid crystal layer 402 and the polarizer 102. In the present embodiment, the liquid crystal layer 402 first converts an angle of the polarization direction of the received image beam L1 to 45 degrees, and then the liquid crystal layer 404 receives the image beam L1 passing through the liquid crystal layer 402, and the liquid crystal layer 404 either passes the converted image beam L1 through the polarizer 102 or blocks it from passing through. The liquid crystal layer 402 first converts the image beams L1 of different polarization directions (0 degree, 135 degrees, 90 degrees and 45 degrees) to 45 degrees according to different operating voltages (2V, 2.3V, 2.8V and 3.1V). Then, the liquid crystal layer 404 acts as a shutter for the converted image beam L1 to determine whether the image beam L1 can pass through the polarizer 102, wherein when the operating voltage of the liquid crystal layer 404 is 12V, the polarization direction of the image beam L1 is parallel to the polarization axis direction of the polarizer 102, so that the image beam L1 can pass through the polarizer 102. When the operating voltage of the liquid crystal layer 404 is 0V, the polarization direction of the image beam L1 is perpendicular to the polarization axis direction of the polarizer 102, so that the image beam L1 cannot pass through the polarizer 102.

The accuracy of the adjustment angles of the image beam L1 as a function of the operating voltages depends upon whether the viewing glasses 100 are aligned with the display screen 106, whether the lenses of the viewing glasses 100 are parallel to the display screen 106 and whether the viewing glasses 100 are tilted. In actual use, a viewer wearing the viewing glasses 100 will not ordinarily stay in that particular position. For example, if the viewer lies down or tilts his head, the position and angle of the viewing glasses 100 relative to the display screen 106 will change. Therefore, the viewing glasses 100 are preferably designed so as also to adjust the image beam L1 by a compensation angle that corrects for the relative spatial orientation of the viewing glasses 100 and the display screen 106, so as to avoid a situation in which the viewer views a relatively dark 3D image. Assuming the display screen 106 is located at an origin of an orthogonal coordinate system, the relative spatial orientation can be taken as the spatial relationship of the viewing glasses 100 and the display screen 106 when the viewing glasses 100 move and/or rotate relative to the display screen 106 along at least one of three coordinate axes of the orthogonal coordinate system.

Figure 5:
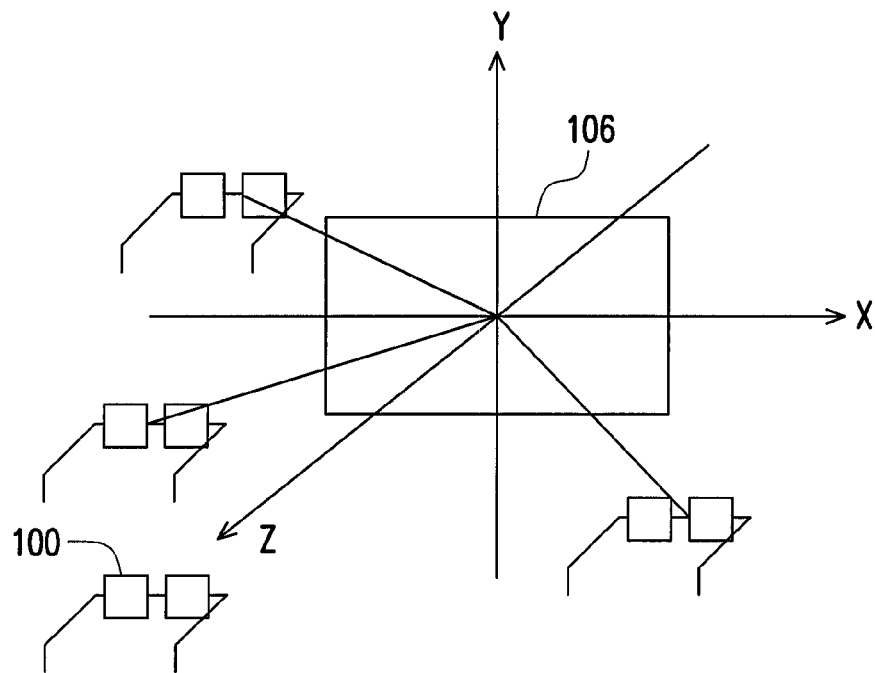
FIG. 5 is a schematic diagram illustrating a 3D display system according to an embodiment of the invention.

There are two principal factors that may influence the relative spatial orientation of the viewing glasses 100 and the display screen 106. One is the tilting angle of the viewing glasses 100, and the other is the position of the viewing glasses 100 relative to the display screen 106. The tilting angle of the viewing glasses 100 refers to a tilting angle of the viewing glasses 100 relative to a reference plane, wherein a normal line of the reference plane is parallel to the image beam L1 received by the viewing glasses 100. The position of the viewing glasses 100 relative to the display screen 106 is illustrated by the schematic diagram of FIG. 5. Assume that the viewing glasses 100 are located in a 3D space defining coordinate axes X, Y and Z, wherein the display screen 106 is located on the X-Y plane and the origin of the X, Y and Z axes is at the center of the display screen 106. The position of the viewing glasses 100 relative to the display screen 106 can be defined by a coordinate value of the viewing glasses 100 in the 3D space formed by the coordinate axes X, Y and Z. As the position of the viewing glasses 100 is varied, the compensation angle required by the viewing glasses 100 for adjusting the polarization direction of the image beam L1 is also varied. Namely, the polarization directions of the image beams L1 received by the viewing glasses 100 located at positions displaced to the left, the right, the top and the bottom of the display screen 106 are different relative to the viewing glasses 100, so that different compensation angles are required for adjusting the polarization directions of the image beams L1.

Figure 6:
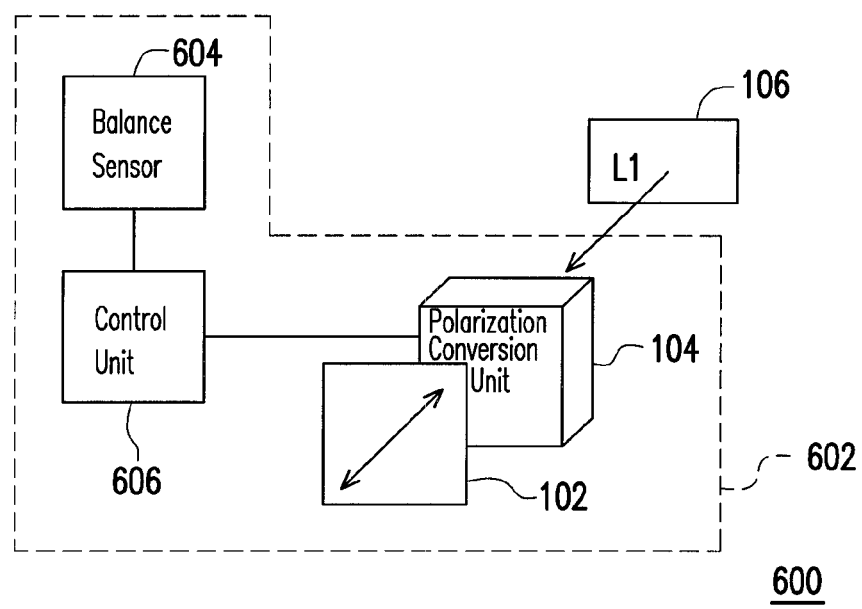
FIG. 6 is a schematic diagram illustrating a 3D display system according to another embodiment of the invention.

Several techniques according to the invention for detecting the relative spatial orientations of the viewing glasses 100 and the display screen 106 will now be described. Referring to FIG. 6, in the 3D display system 600 of the present embodiment, besides the aforementioned polarizer 102 and the polarization conversion unit 104, a pair of viewing glasses 602 further includes a balance sensor 604 and a control unit 606. The control unit 606 is coupled to the balance sensor 604 and the polarization conversion unit 104, and the balance sensor 604 senses a tilting state of the viewing glasses 602, wherein the balance sensor 604 includes at least one of a gravity acceleration sensor, a motion sensor and an electronic compass. The control unit 606 determines the adjustment angle of the image beam L1 according to the polarization direction of the image beam L1, and determines the compensation angle required by the viewing glasses 602 according to the relative spatial orientation of the viewing glasses 602 and the display screen 106 that is sensed by the balance sensor 604.

As noted above, the adjustment angle, which is determined according to the polarization direction of the image beam L1 emitted by the display screen 106, will be different for different types of 3D display devices, and, in the absence of compensation, assumes that the viewing glasses 602 are aligned with the display screen 106, and that the lenses of the viewing glasses 602 are parallel to the display screen 106 and that the viewing glasses 602 do not have any tilting angle. A method for controlling the adjustment angle can be as follows. A user of the viewing glasses 602 manually switches a switch (not shown) disposed on the viewing glasses 602 according to the type of the 3D display device, so as to adjust the angle by which the viewing glasses 602 convert the polarization direction of the image beam L1 in order to convert the polarization direction of the image beam L to be parallel or perpendicular to the polarization axis direction of the polarizer 102. The manual switch need not specify the actual characteristics of the liquid crystals of the LCD display device, but may alternatively designate the device by secondary information including one or more of manufacturer, brand, model number and the like.

Alternatively, the 3D display device may be designed to send a switching signal, so that the viewing glasses 602 adjust the conversion angle for the polarization direction of the image beam L1 according to the switching signal, so as to convert the polarization direction of the image beam L1 to be parallel or perpendicular to the polarization axis direction of the polarizer 102.

The compensation angle is determined according to the relative spatial orientation of the viewing glasses 602 and the display screen 106, and the compensation angle in this embodiment is an angle separate from the adjustment angle by which the viewing glasses 602 additionally rotate the polarization direction of the image beam L1 in order to maintain the polarization direction of the image beam L1 to be parallel or perpendicular to the polarization axis direction of the polarizer 102, when the position and the angle of the viewing glasses 602 relative to the display screen 106 change with the changing viewing position and posture of the viewer.

Therefore, when the viewing glasses 602 are aligned with the display screen 106, and the lenses of the viewing glasses 600 are parallel to the display screen 106 and the viewing glasses 602 do not have any tilting angle, the polarization direction of the image beam L1 is adjusted based only on the adjustment angle, so that the viewing glasses 602 can be suitable for different types of the 3D display devices. If the viewing glasses 602 are already suitable for the 3D display device in question, and only the position and the angle of the viewing glasses 602 relative to the display screen 106 change with the changing viewing position and posture of the viewer, then the polarization direction of the image beam L1 is adjusted based only on the compensation angle. However, if the viewing glasses 602 are not already matched to the 3D display device in use, and the position and the angle of the viewing glasses 602 relative to the display screen 106 vary with the movements of the viewer, then the polarization direction of the image beam L1 is adjusted simultaneously based on both the adjustment angle and the compensation angle.

As described above, by controlling the polarization conversion unit 104 to adjust the polarization direction of the image beam L1 according to the adjustment angle and/or the compensation angle, the polarization direction of the image beam L1 can be adjusted simultaneously according to different polarization directions of the image beam L1 and the relative spatial orientation of the viewing glasses 602 and the display screen 106, so as to ensure that the image beam L1 can completely pass through the polarizer 102 or can be completely blocked by the polarizer 102, and accordingly avoid generating a relatively dark 3D image.

Figure 7:
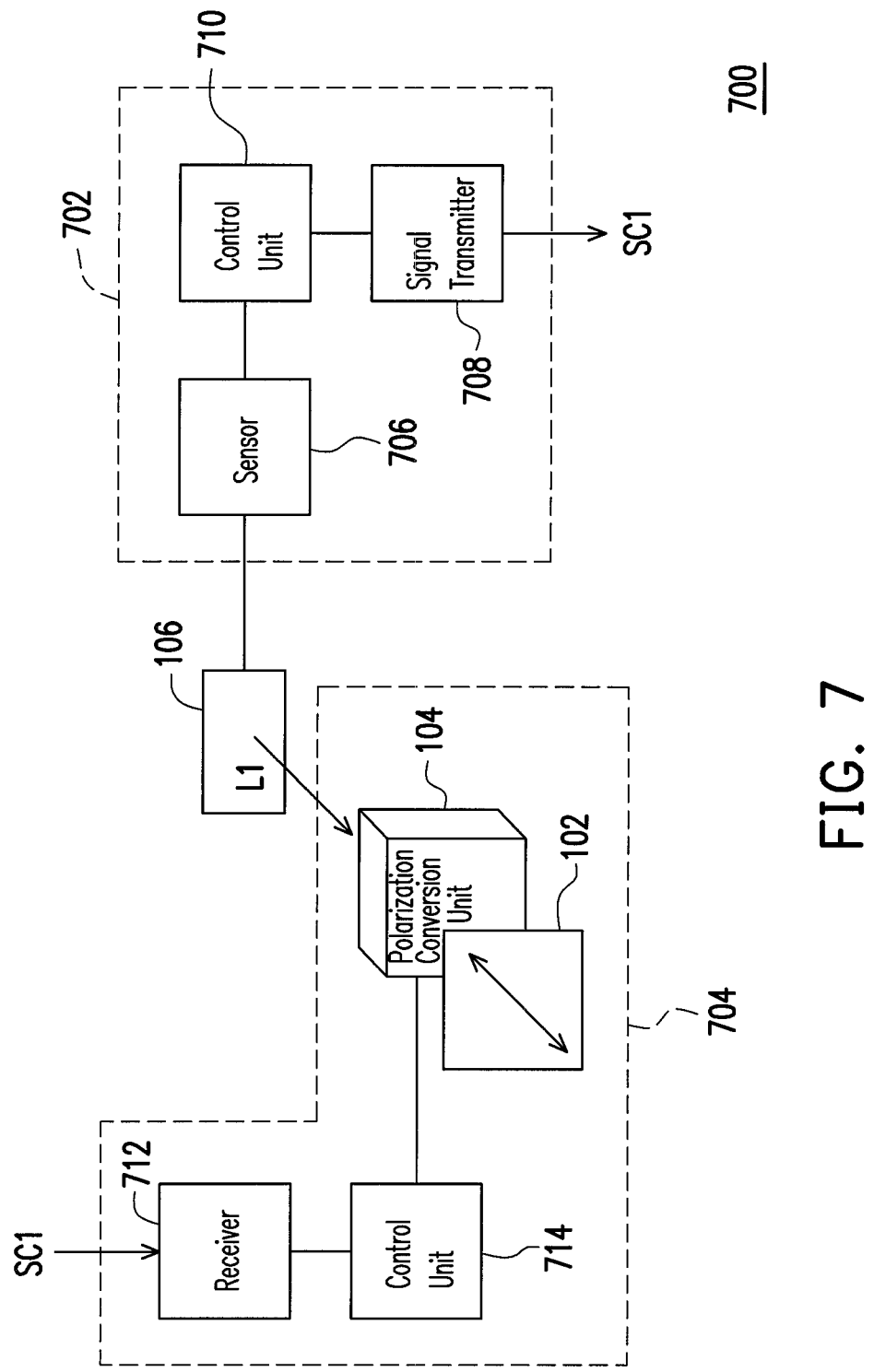
FIG. 7 is a schematic diagram illustrating a 3D display system according to another embodiment of the invention.

In FIG. 7, 3D display system 700 includes a 3D display device 702 and a pair of viewing glasses 704. The 3D display device 702 includes a sensor 706, a signal transmitter 708 and a control unit 710, and the pair of viewing glasses 704 further includes a receiver 712 and a control unit 714 besides the aforementioned polarizer 102 and the polarization conversion unit 104. The control unit 710 of the 3D display device 702 is coupled to the sensor 706 and the signal transmitter 708, and the control unit 714 of the viewing glasses 704 is coupled to the receiver 712 and the polarization conversion unit 104.

The 3D display device 702 in this embodiment not only displays images on the display screen 106 but also detects the relative spatial orientation of the viewing glasses 704 and the display screen 106 by using the sensor 706 thereon. The control unit 710 determines the compensation angle required by the image beam L1 according to the relative spatial orientation detected by the sensor 706, and controls the signal transmitter 708 to transmit a compensation signal SC1 corresponding to the compensation angle to the receiver 712 of the viewing glasses 704 according to the determined compensation angle. The control unit 714 in the viewing glasses 704 determines the adjustment angle according to the polarization direction of the image beam L1, and obtains the compensation angle of the image beam L1 according to the compensation signal SC1 received by the receiver 712, and then controls the polarization conversion unit 104 to adjust the polarization direction of the image beam L1 according to a sum of the adjustment angle and the compensation angle, so as to avoid generating the relatively dark 3D image.

The following table 1 lists examples of compensation angles corresponding to different poses of a viewer's head, and the corresponding operating voltages to correct for the same, for the liquid crystal layers of the embodiments of FIG. 2 and FIG. 4. In an actual application, a look-up table similar to table 1 can be stored in the 3D display device or the viewing glasses, and after the relative spatial orientation of the viewing glasses and the display screen is detected, the corresponding compensation angle and the operating voltages required to be applied to the liquid crystal layers can be directly obtained according to the look-up table. The data of the look-up table, that is, the relationships of various relative spatial orientations, the corresponding compensation angles and the corresponding operating voltages, may reflect actual measurements made when the viewing glasses are designed.

TABLE 1

| Head pose | Compensation angle | Operating voltage of the embodiment of FIG. 4 | | Operating voltage of the embodiment of FIG. 2 |
|---|---|---|---|---|
| Tilting 20 degrees counterclockwise | Rotating 20 degrees clockwise | 402 404 | 2.7 V 12 V/0 V | 202 2.4 V/0 V |
| Tilting 45 degrees clockwise | Rotating 45 degrees counterclockwise | 402 404 | 3.1 V 12 V/0 V | 202 3.1 V/0 V |
| Turning left 45 degrees (Tilting 20 degrees counterclockwise) | Rotating 10 degrees clockwise | 402 404 | 2.75 V 12 V/0 V | 202 2.6 V/0 V |
| Looking up 25 degrees (Tilting 40 degrees clockwise) | Rotating 40 degrees counterclockwise | 402 404 | 3.0 V 12 V/0 V | 202 3.05 V/0 V |

TABLE 1-continued

| Head pose | Compensation angle | Operating voltage of the embodiment of FIG. 4 | Operating voltage of the embodiment of FIG. 2 |
| --- | --- | --- | --- |

For example, when the viewer's head tilts 20 degrees counterclockwise, the compensation angle is to rotate 20 degrees clockwise, i.e. 20 degrees are compensated towards an opposite direction of a head tilting direction. Thus, an operating voltage of 2.4V is applied to the liquid crystal layer 202 of the embodiment of FIG. 2 according to the voltage values of table 1, so as to ensure the that the image beam L1 emitted by the display screen 106 can totally pass through the polarizer 102. The voltage value (2.4V) is an operating voltage required for converting the polarization direction of the image beam to be parallel or perpendicular to the polarization axis direction of the polarizer 102 according to at least one of the compensation angle and the adjustment angle after the compensation angle is added to the adjustment angle corresponding to the polarization direction of the image beam L1. For the FIG. 4 embodiment, the operating voltage required to be applied to the liquid crystal layer 402 is 2.7V, so that the liquid crystal layer 402 converts the polarization direction of the image beam L1 by 45 degrees, and then the operating voltage required to be applied to the liquid crystal layer 404 is the same as that shown in the embodiment of FIG. 4.

Moreover, when the viewer's head turns to the left/right or looks up/down, these actions also correspond to different compensation angles. For example, when the viewer's head turns to the left by 45 degrees, a corresponding compensation angle thereof is equivalent to a compensation angle required when the viewer's head tilts 10 degrees counterclockwise, and when the viewer's head looks up by 25 degrees, a corresponding compensation angle thereof is equivalent to a compensation angle required when the viewer's head tilts 40 degrees clockwise. Therefore, by accessing a look-up table such as table 1, the operating voltage required to be applied to the liquid crystal layer 404 can be quickly obtained, so that the image beam L1 can totally pass through the polarizer 102 without causing the problem of a dark 3D image.

The sensor 706 in the 3D display device 702 can be implemented by an image sensor such as a video camera, etc. Therefore, regarding a method of obtaining the relative spatial orientation of the viewing glasses 704 and the display screen 106, the sensor 706 can be used to capture an image of the viewing glasses 704, and then the control unit 710 analyzes the image captured by the sensor 706 to obtain the relative spatial orientation of the viewing glasses 704 and the display screen 106. When the control unit 710 analyzes the captured image, the control unit 710 can detect a position of a profile of the viewing glasses 704 or a predetermined pattern of the viewing glasses 704 on the captured image, so as to determine the relative spatial orientation of the viewing glasses 704 and the display screen 106. The predetermined pattern on the viewing glasses 704 can be for example a specified block of a specified color on the viewing glasses 704. For example, the viewing glasses 704 can be designed to have a plurality of blocks of the same color (for example, a plurality of red dots), or a long block of alternating blue and white colors, so that the control unit 710 can detect the relative positions of these blocks to determine the relative spatial orientation of the viewing glasses 704 and the display screen 106.

In another embodiment of the invention, the relative spatial orientation between the display screen 106 and a face of the viewer using the viewing glasses 704 whose image is captured by the sensor 706 can be analyzed, for example, based on analysing the relative positions of the ears and nose of the viewer.

Figure 8:
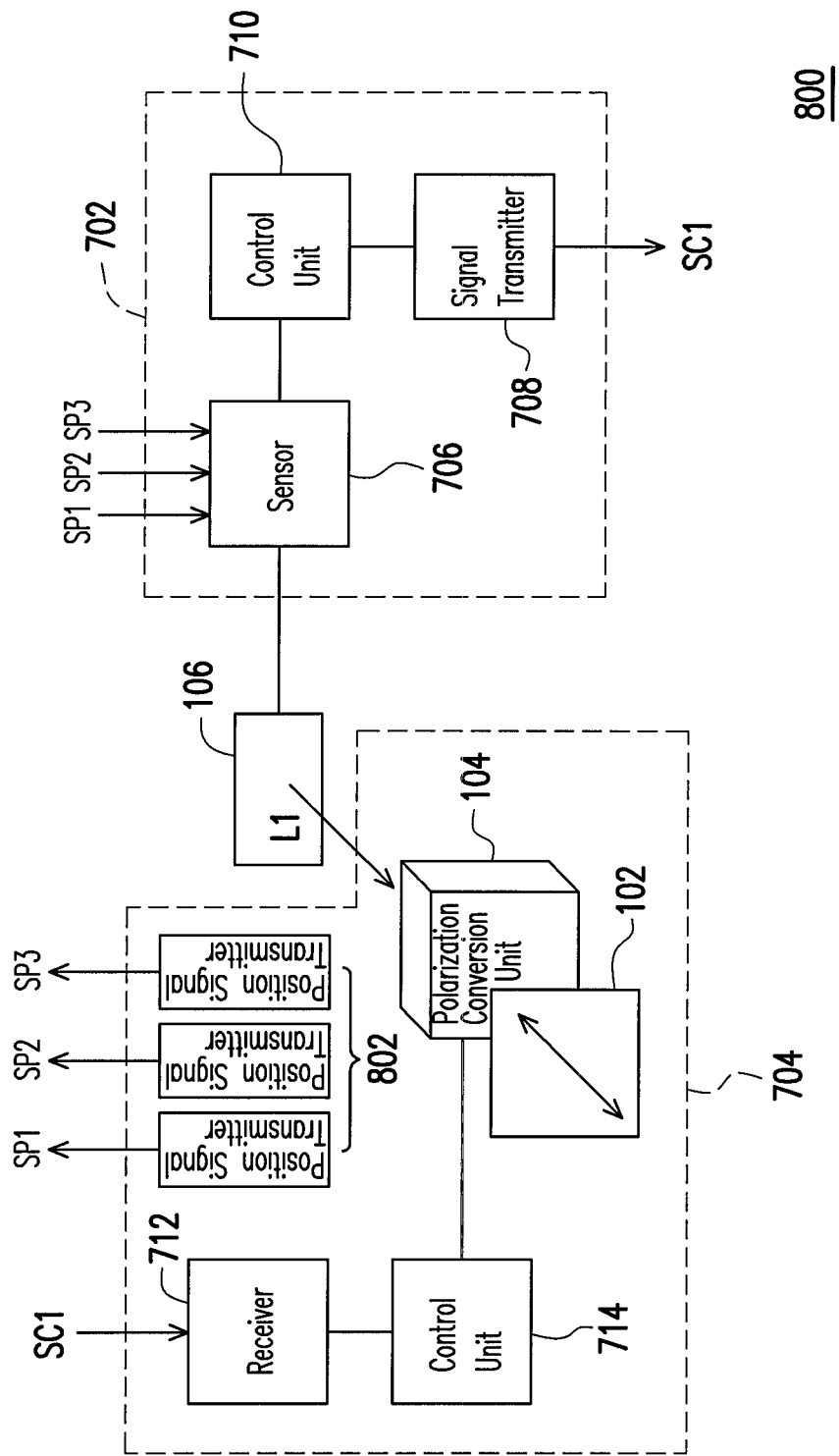
FIG. 8 is a schematic diagram illustrating a 3D display system according to another embodiment of the invention.

The 3D display system 800 of FIG. 8 differs from that of FIG. 7 in that the viewing glasses 704 of the present embodiment further include a plurality of position signal transmitters 802 (three position signal transmitters are illustrated, though a different number could be used). The position signal transmitters 802 are disposed at different positions on the viewing glasses 704 for sending respective position signals SP1, SP2 and SP3, wherein the position signals SP1, SP2 and SP3 may each have signal strengths or wavelengths that differ from the others. The sensor 706 can detect the position signals SP1, SP2 and SP3 sent by the position signal transmitters 802, and determines the relative spatial orientation of the viewing glasses 704 and the display screen 106 according to information (for example, time differences, signal strengths, signal wavelengths and directions, etc. of the position signals SP1, SP2 and SP3) obtained when the position signals SP1, SP2 and SP3 are detected. Alternatively, the position signal transmitters 802 can be disposed at two sides of the viewing glasses 704, so that the sensor 706 can detect the position signals SP1 and SP2 sent by the position signal transmitters 802 to analyze a position and a tilting angle of the viewing glasses 704, so as to determine the relative spatial orientation of the viewing glasses 704 and the display screen 106. It will be apparent to those skilled in the art that various modifications and variations can be made to the type of information provided by the position signals.

Figure 9:
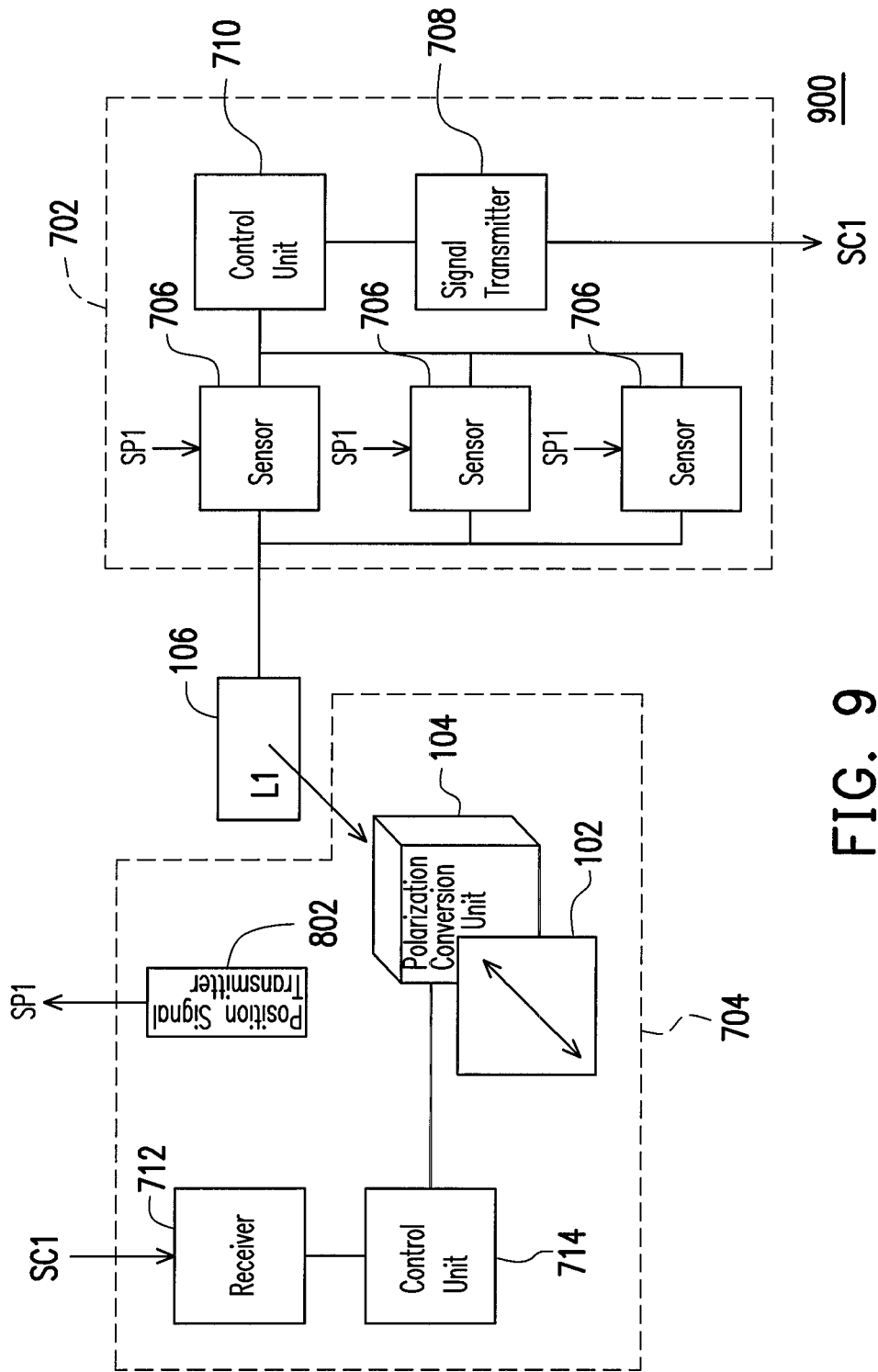
FIG. 9 is a schematic diagram illustrating a 3D display system according to another embodiment of the invention.

The 3D display system 900 of FIG. 9 differs from that of FIG. 8 in that the viewing glasses 704 of the present embodiment include only one position signal transmitter 802, and the 3D display device 702 includes a plurality of sensors 706 (three sensors are illustrated, though a different number could be used). Each of the sensors 706 can detect the position signal SP1 sent by the position signal transmitter 802, and the aforementioned relative spatial orientation is determined according to information (for example, time differences, strengths and directions, etc. of the position signal SP1) obtained when the sensors 706 detect the position signal SP1.

Figure 10:
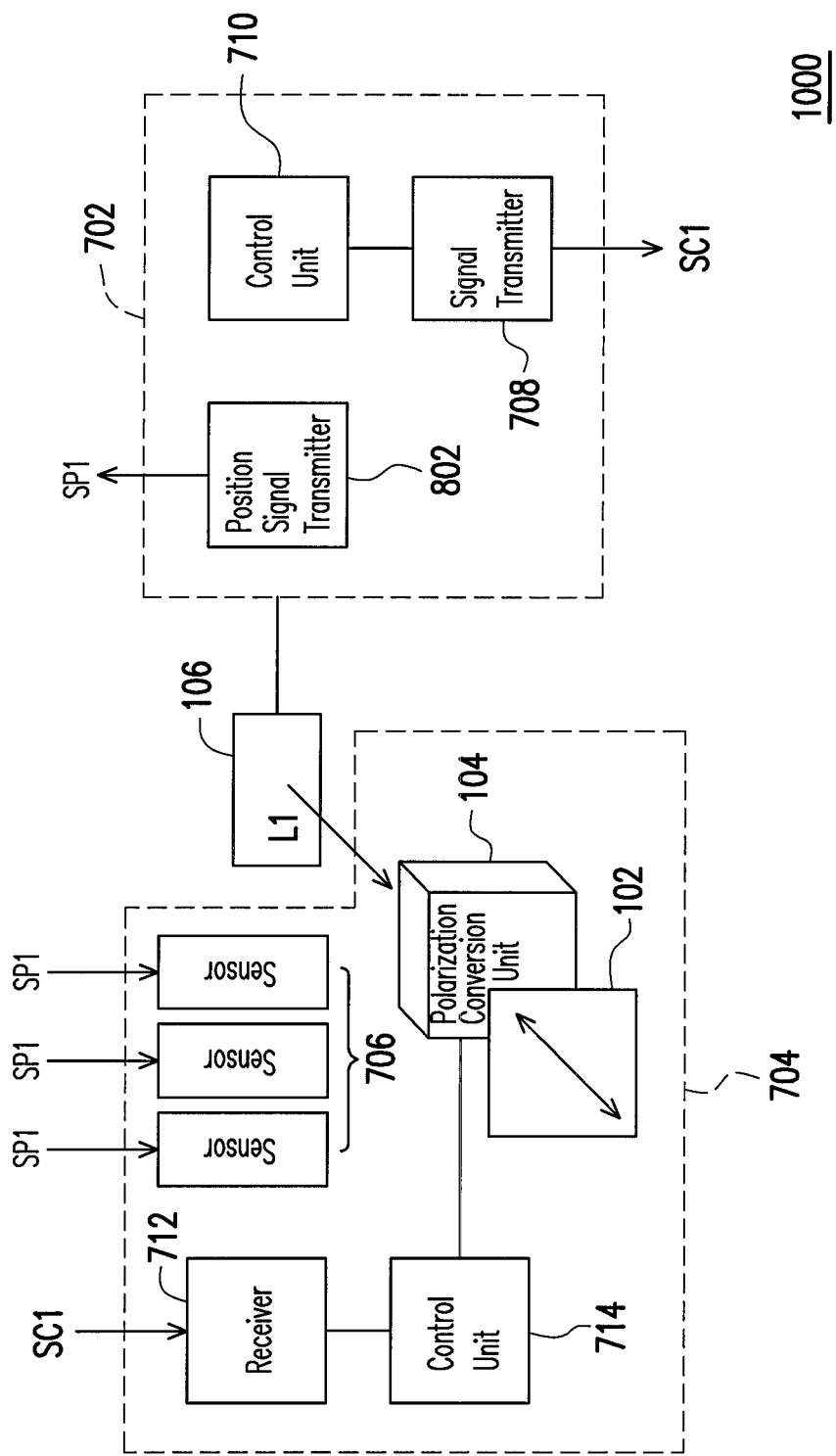
FIG. 10 is a schematic diagram illustrating a 3D display system according to another embodiment of the invention.

The 3D display system 1000 of FIG. 10 differs from that of FIG. 8 in that a plurality of sensors 706 (three sensors are illustrated, though a different number could be used) is used to replace the three position signal transmitters 802 in the viewing glasses 704 of FIG. 8, and one position signal transmitter 802 is used to replace the sensor 706 in the 3D display device 702 of FIG. 8. Each of the sensors 706 may detect the position signal SP1 sent by the position signal transmitter 802, and the aforementioned relative spatial orientation is determined according to information obtained when the sensors 706 detect the position signal SP1. The control unit 714 can determine the aforementioned compensation angle according to the relative spatial orientation, so as to control the polarization conversion unit 104 to adjust the polarization direction of the image beam L1 according to the compensation angle.

Figure 11:
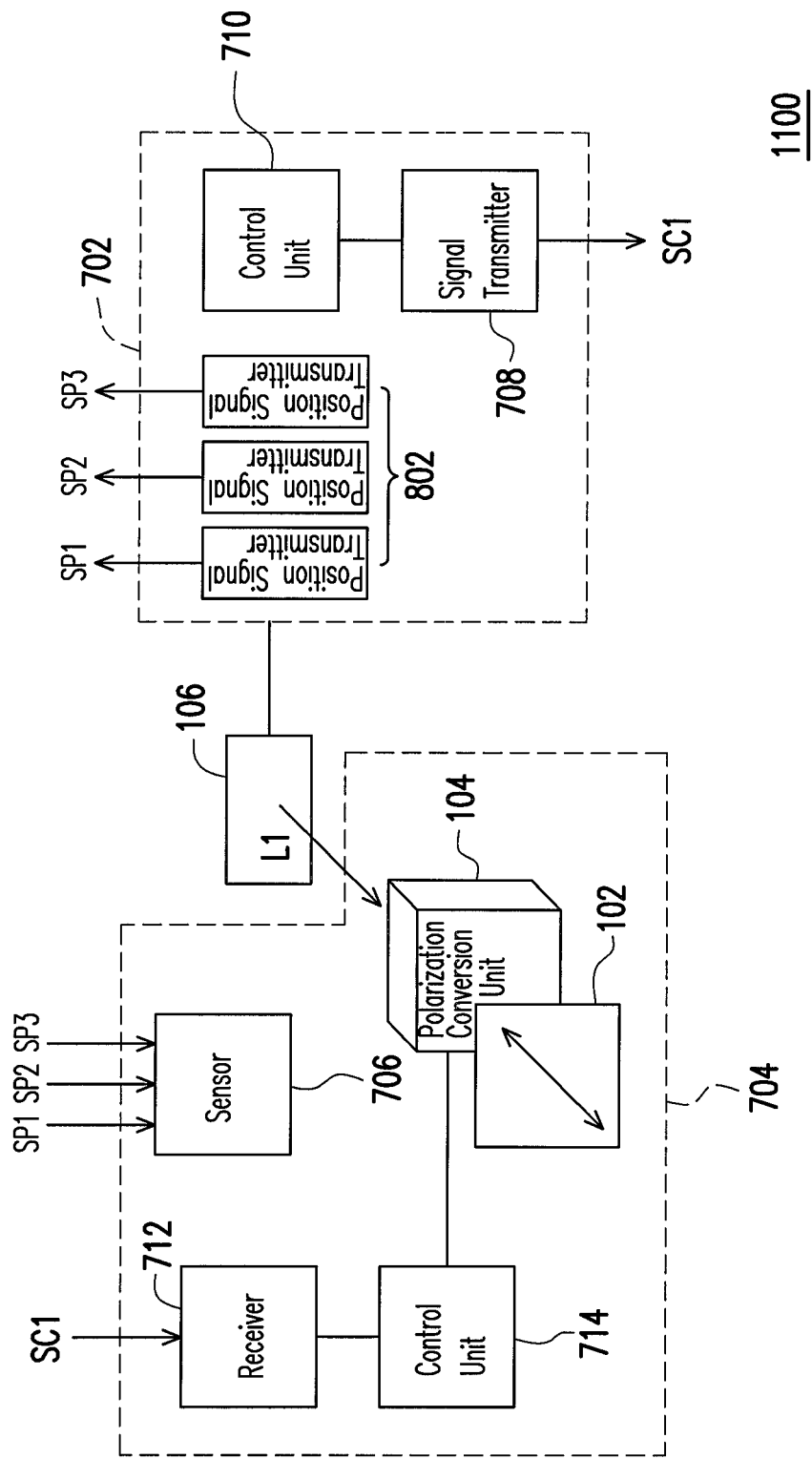
FIG. 11 is a schematic diagram illustrating a 3D display system according to another embodiment of the invention.

The 3D display system 1100 of FIG. 11 differs from that of FIG. 8 in that one sensor 706 is used to replace the three position signal transmitters 802 in the viewing glasses 704 of FIG. 8, and a plurality of position signal transmitters 802 is used to replace the sensor 706 in the 3D display device 702 of FIG. 8. The sensor 706 may detect the position signals SP1, SP2 and SP3 sent by the position signal transmitters 802, and the relative spatial orientation is determined according to information obtained when the sensor 706 detect the position signals SP1, SP2 and SP3. The control unit 714 can determine the aforementioned compensation angle according to the relative spatial orientation, so as to control the polarization conversion unit 104 to adjust the polarization direction of the image beam L1 according to the compensation angle.

The position signal transmitters 802 can be infrared transmitters or infrared diodes, the position signals SP1, SP2 and SP3 can be infrared signals, and the sensor 706 can be an infrared receiver or an infrared video camera, though the invention is not limited thereto. The sensors 706 in FIG. 8 and FIG. 9 are disposed inside or outside the 3D display device 702, and the position signal transmitters 802 are disposed on the viewing glasses 704, while the position signal transmitters 802 in FIG. 10 and FIG. 11 are disposed inside or outside the 3D display device 702, and the sensors 706 are disposed on the viewing glasses 704.

The foregoing embodiments describe a variety of methods for detecting and determining the relative spatial orientation of the viewing glasses 704 and the display screen 106; in practice, however, the methods described above may be used singly or in any appropriate combination to determine the relative spatial orientation of the viewing glasses 704 and the display screen 106. For example, the technique of detecting the profile of the viewing glasses 704 or a predetermined pattern on the viewing glasses 704 or the technique in which the sensor 706 detects the position signals sent by the position signal transmitters 802 on the viewing glasses 704 can each be used in combination with the balance sensor 604 in the embodiment of FIG. 6 to determine the relative spatial orientation of the viewing glasses 704 and the display screen 106.

Moreover, the sensor 706 on the viewing glasses 704 can be implemented in practice by an image sensor such as a video camera, and regarding the method for obtaining the relative spatial orientation of the viewing glasses 704 and the display screen 106, the sensor 706 on the viewing glasses 704 can be used to capture an image of the 3D display device 702, and the control unit 714 analyzes the image captured by the sensor 706 to obtain the relative spatial orientation of the viewing glasses 704 and the display screen 106. When the control unit 714 analyzes the captured image, the control unit 714 can detect a position of a profile of the 3D display device 702 or a predetermined pattern of the 3D display device 702 on the captured image, so as to determine the relative spatial orientation of the viewing glasses 704 and the display screen 106.

Moreover, when the display screen 106 displays images, a brightness of the display screen 106 is higher than that of surrounding objects in the room, so that in some of the embodiments, when the display screen 106 displays images, the position of the display screen 106 can be determined by detecting a bright region having a size the same as that of the display screen 106, so as to determine the relative spatial orientation of the viewing glasses 704 and the display screen 106.

Figure 12:
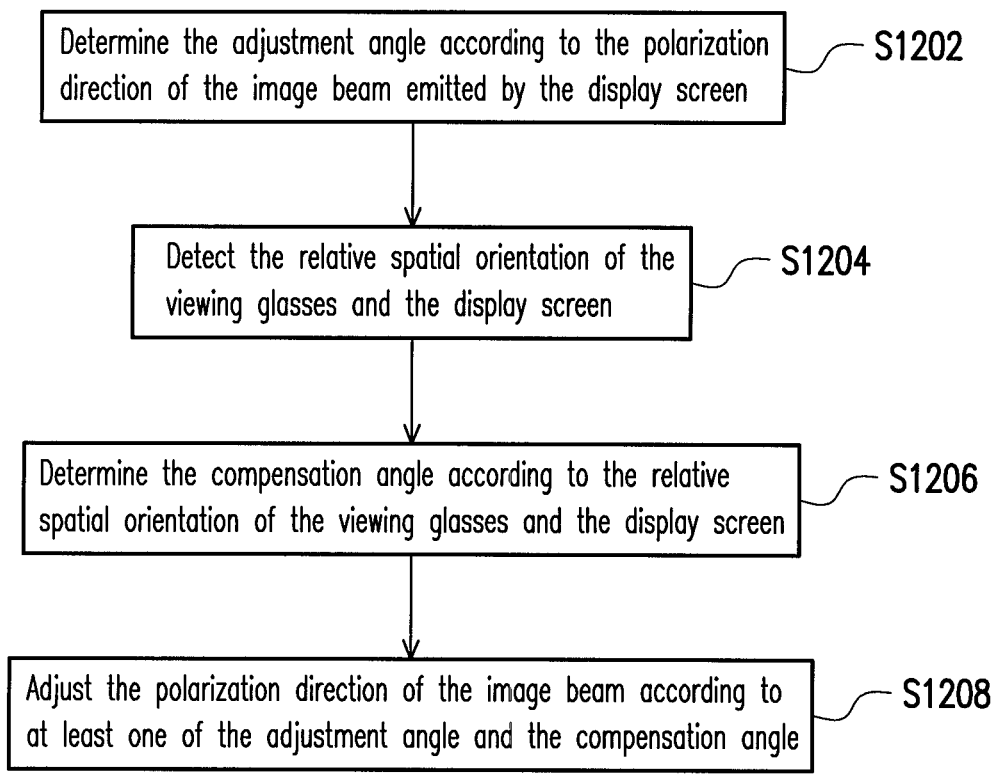
FIG. 12 is a flowchart illustrating an image beam adjustment method according to an embodiment of the invention.

An image beam adjustment method for the 3D display devices of the above embodiments, already described above, is outlined in FIG. 12. First, an adjustment angle is determined according to a polarization direction of an image beam emitted by a display screen (step S1202). Then, a relative spatial orientation of the viewing glasses and the display screen is detected (step S1204). For example, the viewing glasses can transmit a plurality of position signals, and the 3D display device can detect the position signals, so as to obtain the relative spatial orientation of the viewing glasses and the display screen. Alternatively, the 3D display device can capture an image of the viewing glasses, and analyze the image to detect the relative spatial orientation of the viewing glasses and the display screen. Moreover, the 3D display device can also analyze the image to detect a relative spatial orientation between the display screen and a face of a viewer using the viewing glasses, so as to obtain the relative spatial orientation of the viewing glasses and the display screen.

Then, in step S1206, a compensation angle required for adjusting the polarization direction of the image beam is determined according to the relative spatial orientation. The polarization direction of the image beam is adjusted according to at least one of the adjustment angle and the compensation angle, so as to convert the polarization direction of the image beam to be parallel or perpendicular to the polarization axis direction of the polarizer (step S1208). In this way, the viewing glasses can support the 3D display devices emitting image beams of different polarization directions, so as to save production cost for manufacturer, and spare users the expense of buying multiple pairs of 3D glasses.

In summary, in the invention, the polarization conversion unit adjusts the polarization direction of the image beam according to the polarization direction of the image beam emitted by the display screen and the relative spatial orientation of the viewing glasses and the display screen. Moreover, the adjustment angle of the polarization direction of the image beam can be compensated according to the user's viewing position and posture, so as to avoid a problem of dark 3D images.

It will be apparent to those skilled in the art that various modifications and variations can be made to the devices and method of the invention without departing from the scope or spirit of the invention. In view of the foregoing, it is intended that the invention cover all modifications and variations of this invention as fall within the true scope and spirit of the following claims and their equivalents.

What is claimed is:

1. A pair of glasses for viewing three-dimensional (3D) image content, comprising a glasses frame and two lenses, at least one of the two lenses comprising a polarizer and a polarization conversion unit in front of the polarizer, wherein the polarization conversion unit is adapted to adjust a polarization direction of an incoming image beam to a polarization direction that is either parallel or perpendicular to a polarization axis direction of the polarizer, wherein said polarization conversion unit comprises a first liquid crystal layer and a second liquid crystal layer, wherein a magnitude of an operating voltage supplied to said first liquid crystal layer controls an extent of adjustment of the polarization direction of the incoming image beam, and wherein said second liquid crystal layer is disposed between the first liquid crystal layer and the polarizer and is adapted to maintain the polarization direction of the incoming image beam passing through the first liquid crystal layer or to convert the polarization direction of the incoming image beam passing through the first liquid crystal layer to a perpendicular polarization direction.

2. The pair of glasses according to claim 1, wherein each of the two lenses comprises a said polarizer and a said polarization conversion unit.

3. The pair of glasses according to claim 2, wherein the polarization conversion unit for one of the two lenses is synchronized with the polarization conversion unit for the other of the two lenses, such that when the incoming image beam is converted to a polarization direction that is parallel to the polarization axis direction of the polarizer for one of the two lenses, said incoming image beam is simultaneously converted to a polarization direction that is perpendicular to the polarization axis direction of the polarizer for the other of the two lenses.

4. The pair of glasses according to claim 1, further comprising a control unit that outputs a control signal to said polarization conversion unit, said control signal indicating an extent of polarization conversion needed to convert a given incoming image beam to said polarization direction that is either parallel or perpendicular to the polarization axis direction of the polarizer.

5. The pair of glasses according to claim 4, wherein said polarization conversion unit is adapted to convert the polarization direction of the incoming image beam to the polarization direction that is parallel to the polarization axis of the polarizer, in response to a control signal having the operating voltage of 0 volts.

6. The pair of glasses according to claim 4, further comprising at least one sensor for detecting at least one of a position and orientation of said pair of glasses relative to a reference plane, said at least one sensor communicating with said control unit to generate a compensation angle such that the polarization conversion unit adjusts the polarization direction of the incoming image beam based upon both the polarization axis direction of the polarizer and at least one of the position and orientation of said pair of glasses relative to the reference plane.

7. The pair of glasses according to claim 6, wherein the at least one sensor captures an image of a 3D display device, and the control unit analyzes the image to generate the compensation angle.

8. The pair of glasses according to claim 4, further comprising a receiver in communication with said control unit, said receiver being adapted to receive a compensation signal and communicate the compensation signal to the control unit, said control unit outputting the control signal to said polarization conversion unit to adjust the polarization direction of the incoming image beam based upon at least one of the compensation signal and any difference in the polarization direction of the incoming image beam and the polarization axis direction of the polarizer.

9. The pair of glasses according to claim 1, wherein said polarization conversion unit is adapted to adjust the polarization direction of the incoming image beam by an angle larger than or equal to 0 degree and smaller than or equal to 90 degrees.

10. The pair of glasses according to claim 1, further comprising a manual input by which a user may select among plural types of 3D display devices, the manual input defining an extent to which the polarization conversion unit will adjust the polarization direction of the incoming image beam relative to the polarization axis direction of the polarizer.

11. In combination, a pair of glasses for viewing three-dimensional (3D) image content, and a display device for displaying 3D image content, the pair of glasses comprising a glasses frame and two lenses, at least one of the two lenses comprising a polarizer and a polarization conversion unit in front of the polarizer, wherein the polarization conversion unit is adapted to adjust a polarization direction of an incoming image beam from said display device to a polarization direction that is either parallel or perpendicular to a polarization axis direction of the polarizer, wherein said polarization conversion unit comprises a first liquid crystal layer and a second liquid crystal layer, wherein a magnitude of an operating voltage supplied to said first liquid crystal layer controls an extent of adjustment of the polarization direction of the incoming image beam, and wherein said second liquid crystal layer is disposed between the first liquid crystal layer and the polarizer and is adapted to maintain the polarization direction of the incoming image beam passing through the first liquid crystal layer or to convert the polarization direction of the incoming image beam passing through the first liquid crystal layer to a perpendicular polarization direction.

12. The combination according to claim 11, wherein each of the two lenses comprises a said polarizer and a said polarization conversion unit.

13. The combination according to claim 12, wherein the polarization conversion unit for one of the two lenses is synchronized with the polarization conversion unit for the other of the two lenses, such that when the incoming image beam is converted to the polarization direction that is parallel to the polarization axis direction of the polarizer for one of the two lenses, said incoming image beam is simultaneously converted to the polarization direction that is perpendicular to the polarization axis direction of the polarizer for the other of the two lenses.

14. The combination according to claim 11, further comprising a first control unit that outputs a control signal to said polarization conversion unit, said control signal indicating an extent of polarization conversion needed to convert a given incoming image beam to said polarization direction that is either parallel or perpendicular to the polarization axis direction of the polarizer.

15. The combination according to claim 14, further comprising at least one sensor for detecting at least one of a position and orientation of said pair of glasses relative to a reference plane, said at least one sensor communicating with said first control unit to generate a compensation angle such that the polarization conversion unit adjusts the polarization direction of the incoming image beam based upon both the polarization axis direction of the polarizer and at least one of the position and orientation of said pair of glasses relative to the reference plane.

16. The combination according to claim 15, wherein said at least one sensor is disposed on the pair of glasses.

17. The combination according to claim 16, wherein the at least one sensor captures an image of a 3D display device, and the first control unit analyzes the image to generate the compensation angle.

18. The combination according to claim 15, wherein said at least one sensor is disposed on the display device.

19. The combination according to claim 18, wherein the pair of glasses further comprises a plurality of position signal transmitters, and each of the position signal transmitters sends a position signal to said at least one sensor disposed on the display device.

20. The combination according to claim 18, wherein said at least one sensor captures an image of the viewing glasses.

21. The combination according to claim 20, further comprising a second control unit in the display device that analyzes the image to detect a profile or a predetermined pattern of the pair of glasses.

22. The combination according to claim 11, wherein said polarization conversion unit is adapted to adjust the polarization direction of the incoming image beam by an angle larger than or equal to 0 degree and smaller than or equal to 90 degrees.

23. A method for adjusting an image beam of a three-dimensional (3D) display device, comprising determining an adjustment angle needed to cause a polarization direction of the image beam emitted by the display device to be either parallel or perpendicular to a polarization axis direction of a polarizer in a pair of 3D glasses being used to view the display device; detecting a relative spatial orientation of the pair of 3D glasses to the display device based upon at least one of position and tilt of the pair of 3D glasses; generating a compensation signal to correct the polarization direction of the image beam emitted by the display device in accordance with the compensation signal; and actuating a polarization converter in the pair of 3D glasses to adjust the polarization of the image beam emitted by the display device based upon both the adjustment angle and a compensation angle indicated by the compensation signal to be either parallel or perpendicular to the polarization axis direction of the polarizer of the pair of 3D glasses being used to view the display device.

24. The method according to claim 23, wherein the relative spatial orientation is a spatial relationship between the pair of 3D glasses and the display device when the viewing glasses move and/or rotate relative to the display device along at least one of three coordinate axes of an orthogonal coordinate system, the polarization direction of the image beam is different for different types of 3D display devices.

25. The method according to claim 23, wherein detecting the relative spatial orientation is effected by sending a plurality of position signals from the pair of 3D glasses or the display device, and the other of the pair of 3D glasses and the display device detects the position signals, so as to obtain the relative spatial orientation according to time differences obtained when detecting the position signals.

* * * * *